(12) United States Patent
Kawasaki et al.

(10) Patent No.: US 7,623,359 B2
(45) Date of Patent: Nov. 24, 2009

(54) ASSEMBLY HAVING A STRUCTURE FOR CLAMPING THE HARNESSES AND IMAGE-FORMING MACHINE

(75) Inventors: Kotaro Kawasaki, Osaka (JP); Toshio Hori, Osaka (JP); Shinji Ito, Osaka (JP); Kiyonori Yamamoto, Osaka (JP); Naoki Yamane, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 235 days.

(21) Appl. No.: 11/713,028

(22) Filed: Mar. 2, 2007

(65) Prior Publication Data

US 2007/0207640 A1 Sep. 6, 2007

(30) Foreign Application Priority Data

Mar. 6, 2006 (JP) .............................. 2006-059513

(51) Int. Cl.
H05K 7/02 (2006.01)
(52) U.S. Cl. ................... 361/807; 361/809; 361/810; 361/826
(58) Field of Classification Search ......... 361/807–810, 361/826; 174/520
See application file for complete search history.

(56) References Cited

U.S. PATENT DOCUMENTS 3,083,261 A * 3/1963 Francis et al. ............. 174/88 R
5,136,470 A * 8/1992 Sheridon et al. ............ 361/749
5,748,156 A * 5/1998 Weber ..................... 343/762
6,078,498 A * 6/2000 Eckerd et al. ............. 361/685
6,943,292 B2 * 9/2005 Dingman ................. 174/535
7,142,422 B2 * 11/2006 Lee et al. ................ 361/695
7,170,759 B2 * 1/2007 Soga ..................... 361/825
7,196,907 B2 * 3/2007 Zheng ................... 361/760

FOREIGN PATENT DOCUMENTS

JP 2003-204409 7/2003
JP 2005-93734 4/2005

* cited by examiner

Primary Examiner—Dameon E Levi
(74) Attorney, Agent, or Firm—Smith, Gambrell & Russell, LLP

(57) ABSTRACT

A structure for clamping the harnesses, enabling the harnesses attached to the substrate or the harnesses around the substrate to be clamped by using parts that have been usually used. An assembly having the structure for clamping the harnesses comprises a circuit board on which parts are mounted on one side thereof; a shielding plate arranged on the other surface side thereof; and an insulating sheet arranged between the other surface of the circuit board and the shielding plate; wherein the harnesses are extending around the circuit board. The insulating sheet forms a clamp protruding outward beyond the circuit board, and the harnesses are engaged with a protruding piece.

11 Claims, 7 Drawing Sheets

Fig. 7
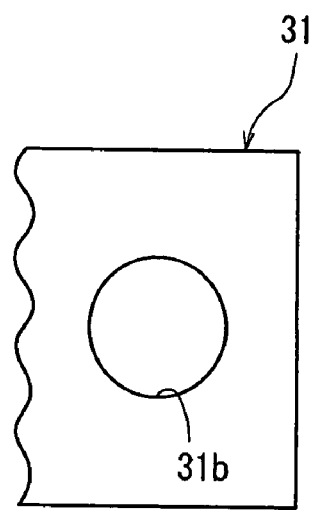
A
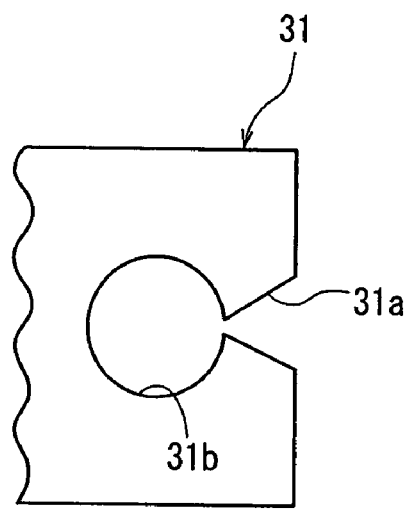
B
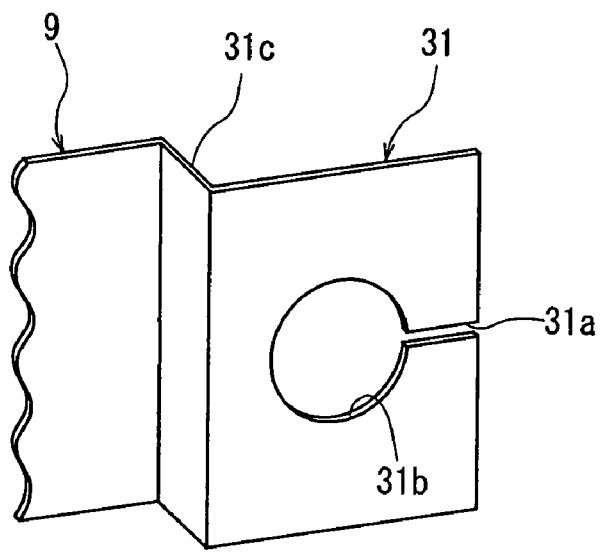
C

ASSEMBLY HAVING A STRUCTURE FOR CLAMPING THE HARNESSES AND IMAGE-FORMING MACHINE

BACKGROUND OF THE INVENTION

1. Field of the Invention

The present invention relates to an assembly having a structure for clamping the harnesses that extend from the substrates having electric/electronic circuitry or that extend around the substrates, and an image-forming machine.

2. Description of the Related Art

Precision electronic equipment such as a printer includes, for example, a main substrate having a control unit for the whole device such as CPU, an operation panel substrate, a sub-substrate for controlling a printer drive unit, and other substrates. These substrates are connected together through a harness of the power source system and a harness of the signal system in an electronic/electric equipment.

The harnesses extend on the substrates or inside the device, and are fixed so will not to interfere with other members. Due to vibration of the drive unit, however, the members covering the harnesses may be abraded or damaged by the frame, and a fire may break out or a malfunction may occur if the core members of the harnesses come in contact with the frame due to wear or damage. A variety of fixing methods have been proposed for fixing the harnesses. For example, a clip with a bundling portion is fixed at its one end to the device and has a harness-bundling portion at the other end thereof. The clip is inserted in a clip hole formed in a suitable portion of the device, and the harnesses are bundled and fixed by the clip having the bundling portion. Another fixing means may be a band with washer. A screw is inserted in a hole of the washer, the band with washer is fixed into a screw hole formed in a suitable place of the device or appliance, and the harnesses are bundled by the foldable band portion.

A harness-clamping portion may be further formed by machining an existing part without using a dedicated fixing member to fix the harnesses.

According to a technology disclosed in JP-A-2003-204409, resin ribs are formed on the inner surface of a casing of a printer to reinforce the casing, a recessed portion is formed in the gap between the casing and the reinforcing ribs on the inside of the casing by utilizing the reinforcing ribs, and the inside of the recessed portion is utilized as a harness-receiving portion.

According to a technology disclosed in JP-A-2005-093734, a plurality of notches are formed in the edge portion of the circuit board on which electronic parts are mounted, and a through hole is formed in the circuit board. The harnesses connected to the circuit board are hooked by the notches so as to be clamped to the circuit board. Or, the harnesses are passed through the hole so as to be clamped to the circuit board.

SUMMARY OF THE INVENTION

When the recessed portion is formed together with the reinforcing ribs in the casing of the printer as taught in JP-A-2003-204409, however, the reinforcing ribs are not always present near the circuit board, and the harnesses may not often be clamped near the circuit board, lacking general applicability.

When the notches and holes are formed in the circuit board as taught in JP-A-2005-093734, the harnesses inevitably extend on the substrate so as to penetrate through on the back side of the substrate from the front side. Legs of the soldered electronic parts have been exposed on the back side of the circuit board. In order to avoid contact between the harnesses and the leg portions, therefore, it is not allowed to solder the electronic parts at portions where the harnesses pass through. Therefore, the size of the circuit board often unnecessarily increases by an amount equivalent to the portions where the notches and holes are formed and by an amount equivalent to the portions where the harnesses extend on the back side of the circuit board. Therefore, the effective area of the substrate for arranging the electronic parts becomes narrow and, besides, the substrate size increases by the amount the notches and holes are formed in the substrate. Further, a laborious work is required for forming notches and holes in the circuit board.

The present invention was accomplished in view of the above circumstances and has an object of providing a structure for clamping the harnesses, enabling the harnesses attached to the substrate or the harnesses around the substrate to be easily clamped by using parts that have been usually used without driving up the cost.

In order to achieve the above object, an assembly having a structure for clamping the harnesses extending around a circuit board of the present invention comprises:

a circuit board on which electronic parts are mounted;

a circuit board-mounting plate (shielding plate) arranged maintaining a gap relative to the circuit board; and an insulating sheet arranged between the circuit board and the circuit board-mounting plate;

wherein the insulating sheet forms a protruding portion protruding outwards beyond the circuit board, a harness-engaging portion is formed in the protruding portion, and the harnesses are engaged with the harness-engaging portion.

In the assembly having the structure for clamping the harnesses, the engaging portion can be formed by a hole formed in the protruding portion of the insulating sheet and by a notch formed between the hole and an edge portion of the protruding portion.

In the assembly having the structure for clamping the harnesses, folded portions are formed at the edges of the circuit board-mounting plate, and slit-like holding portions are formed in the folded portions to hold the protruding portions of the insulating sheet.

In the assembly having the structure for clamping the harnesses, the direction of the notch is at right angles with the direction in which the harnesses extend.

In The assembly having the structure for clamping the harnesses, a material of the insulating sheet is polyethylene terephthalate, fluoroplastic, polyvinyl chloride resin and rubber.

The present invention is further concerned with an image-forming machine incorporating an assembly having a structure for clamping the harnesses to connect the members in the machine body, wherein the assembly having the structure for clamping the harnesses is constituted by any one of the assemblies having the structure for clamping the harnesses described above.

BRIEF DESCRIPTION OF THE DRAWINGS

FIG. 7 illustrates modified examples of a protruding piece of the insulating sheet provided in the circuit board assembly, wherein FIG. 7A is a plan view omitting the notch in the protruding piece, FIG. 7B is a plan view in a state where the width of notch in the protruding piece is increased on the side of inserting the harnesses, and FIG. 7C is a perspective view of the protruding piece arranged at a position higher by a step than the surface of the insulating sheet.

DETAILED DESCRIPTION OF THE PREFERRED EMBODIMENTS

Figure 1:
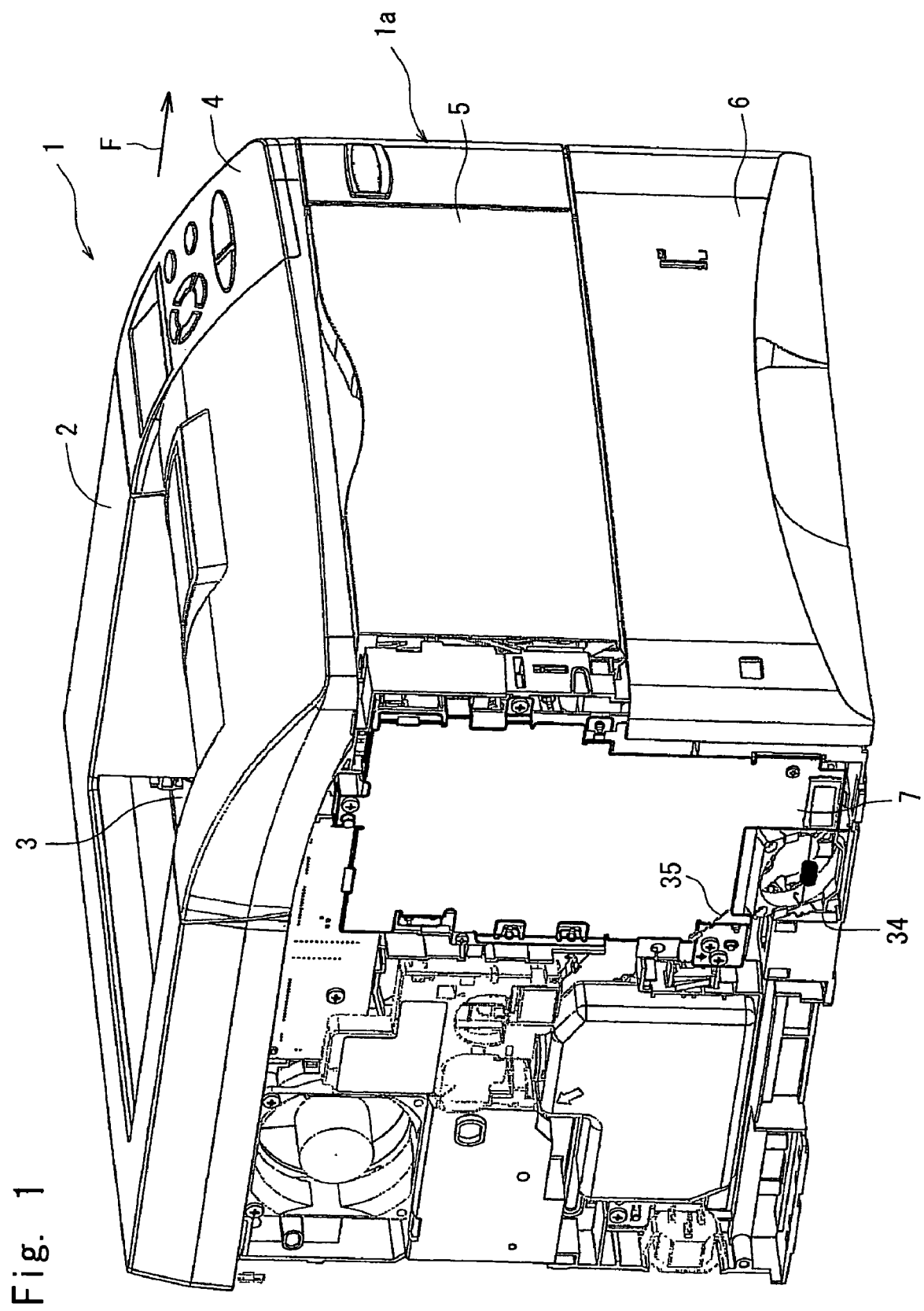
FIG. 1 is a perspective view of a printer incorporating a circuit board employing an assembly having a structure for clamping the harnesses according to an embodiment of the invention.

An assembly having a structure for clamping the harnesses according to an embodiment of the invention and an image-forming machine incorporating the above assembly will now be described with reference to the drawings. In this specification, for easy explanation, the side of an operation portion 4 of a printer is regarded to be the front side of the printer 1 (direction of an arrow F in the drawing).

FIG. 1 illustrates the printer 1 which is an image-forming machine employing the structure for clamping the harnesses according to the invention. The printer 1 is equipped with a machine body 1a of nearly a rectangular parallelopiped shape. On the upper surface of the machine body 1a, an upper panel 2 is mounted having a discharge port 3 for discharging the printed papers and the operation portion 4. In the front surface of the printer 1, an opening/closing door 5 is arranged in an upper portion to introduce and take out a printing unit that is not shown. A cassette 6 for holding the printing papers is arranged on the lower portion thereof. The cassette 6 is arranged so as to be slid back and forth relative to the machine body 1a, i.e., so as to be drawn out and pushed in.

Figure 2:
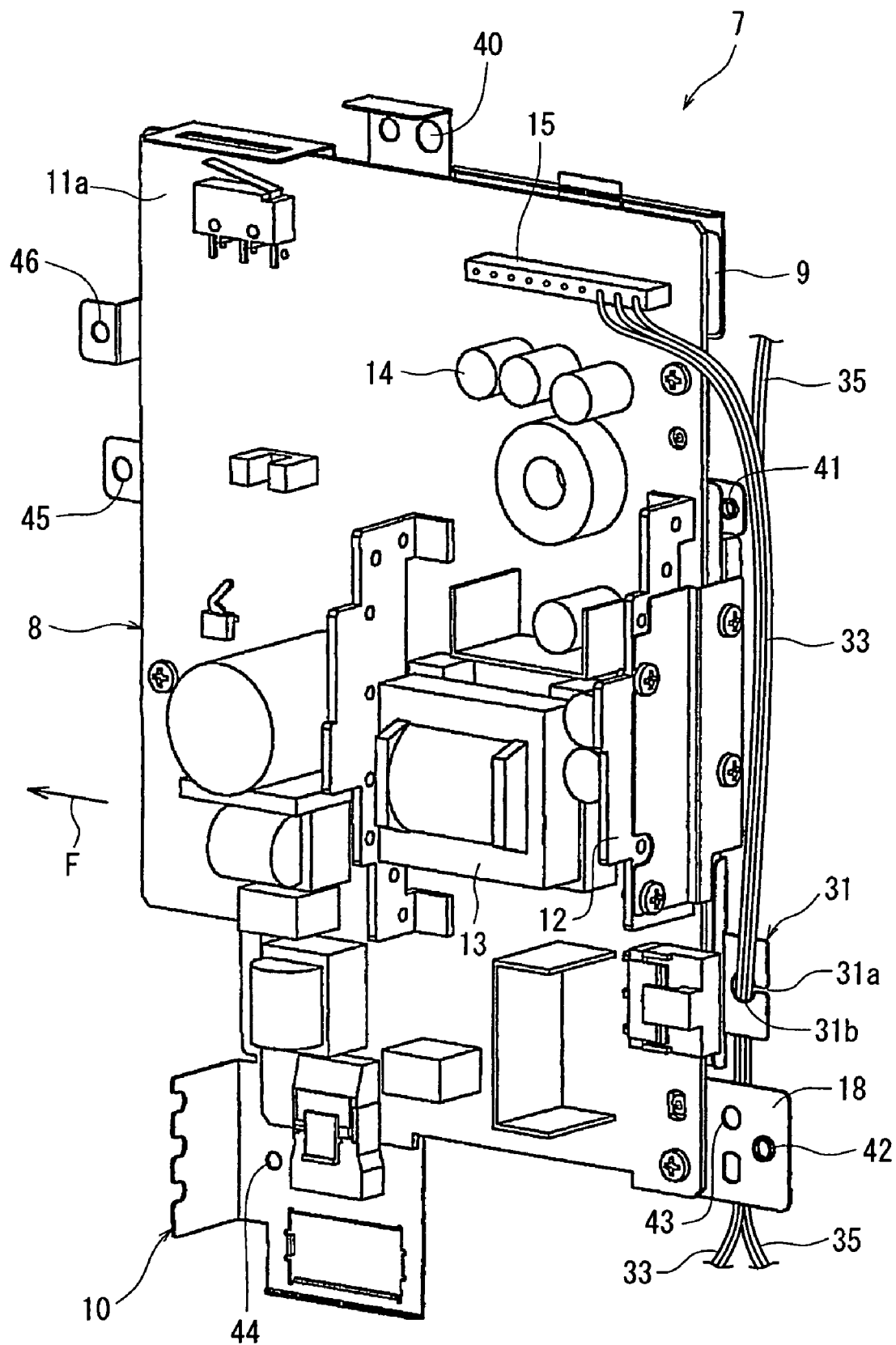
FIG. 2 is a perspective view of a circuit board assembly constituted by the circuit board arranged in the printer of FIG. 1, an insulating sheet and a shielding plate as viewed from the inside of the printer.
Figure 3:
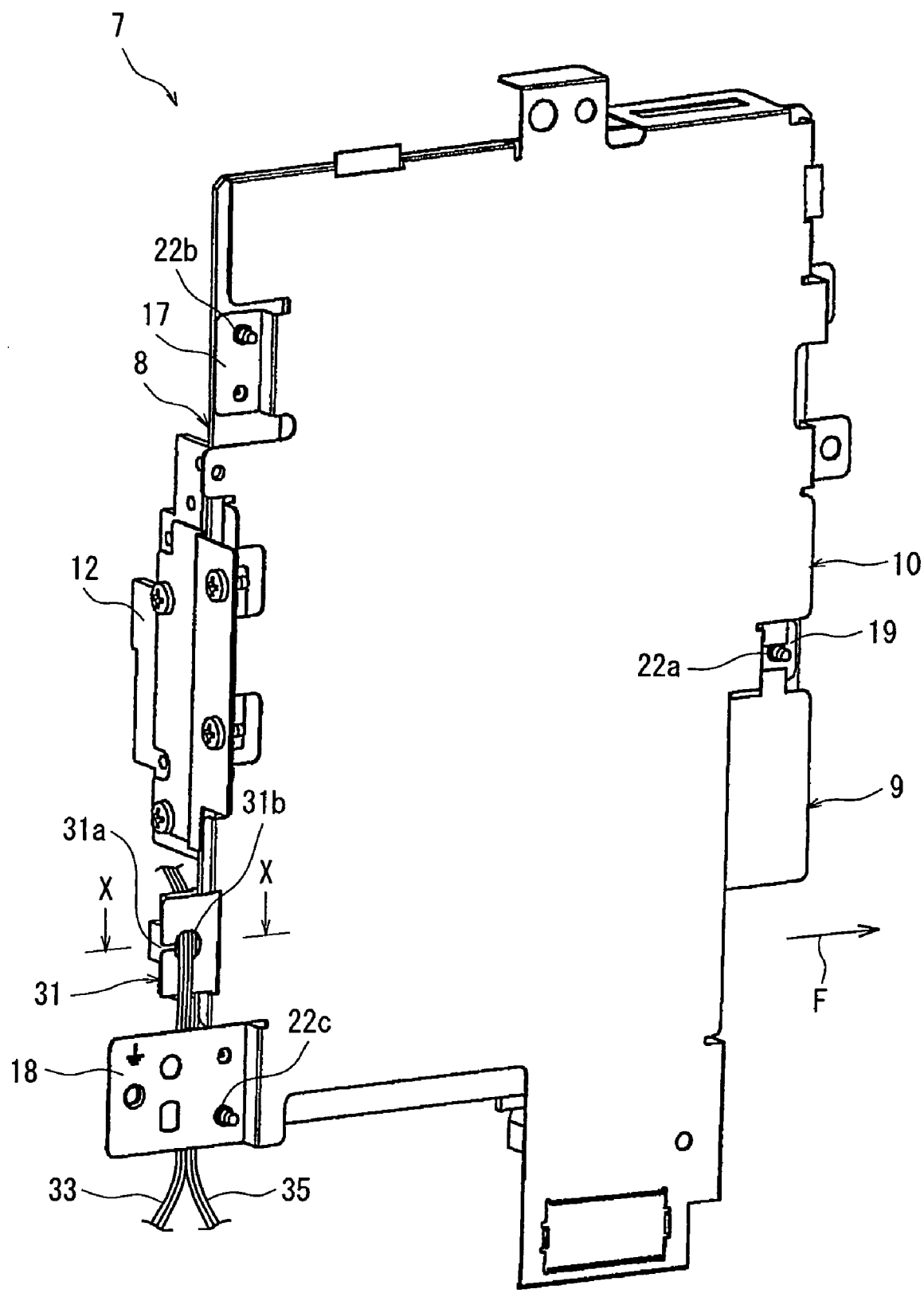
FIG. 3 is a perspective view of the circuit board assembly arranged in FIG. 1 as viewed from the outside of the printer.

In FIG. 1, the machine body 1a is in a state where a side cover is removed from the side portion, and the internal structure of the printer 1 is seen. On the side portion yet front side of the printer 1, a circuit board assembly 7 is arranged being equipped with a structure for clamping the harnesses as shown in FIGS. 2 and 3 to control various portions of the printer 1. The circuit board assembly 7 is constituted by a circuit board 8, an insulating sheet 9 and a shielding plate 10 which is a circuit board-mounting plate, which are successively arranged from the inner side toward the outer side of the printer 1 (see FIG. 4).

Referring to FIG. 2, the plate-like circuit board 8 has electronic parts that constitute a circuit being arranged on the side of the inner surface 11a facing the inside of the printer 1. For example, the circuit board 8 has an integrated circuit 12 with a heat sink, a transformer 13, capacitors 14, a connector 15 and the like which are arranged thereon and are attached to the circuit board 8 being soldered on the back surface side thereof.

A plurality of harnesses are connected to the connector 15 provided on the circuit board 8, a harness bundle 33 which is part of the harnesses extends along the back side of the circuit board assembly 7 and is connected to other circuit boards that are not shown. Referring to FIG. 1, further, a ventilation fan is mounted as designated at 34 in the rear lower part of the circuit board assembly 7, and a harness 35 is arranged for the ventilation fan.

In FIG. 2, reference numerals 40 to 46 are screw holes for mounting the circuit board assembly 7 on the mounting portions (not shown) of the frame of the printer 1 by using screws.

The insulating sheet 9 is an elastic resin sheet (fluoroplastic, polyvinyl chloride resin and rubber, or the like) which, in this embodiment, is a PET (polyethylene terephthalate) sheet. Namely, an insulating material can be used preferably having an elasticity. However, the elasticity is not necessarily required. In order to insulate the circuit board 8 from the shielding plate 10, the insulating sheet 9 is usually arranged on the back surface side of the circuit board 8 when the gap is narrow between these members.

The shielding plate 10 which is nearly of the shape of a flat plate forming a plurality of folded portions along the peripheral edge portions thereof plays the role of preventing electromagnetic waves and high-frequency waves generated by the parts mounted on the circuit board 8 from leaking to the outer side or preventing electromagnetic waves and high-frequency waves from entering from the outer side.

Figure 4:
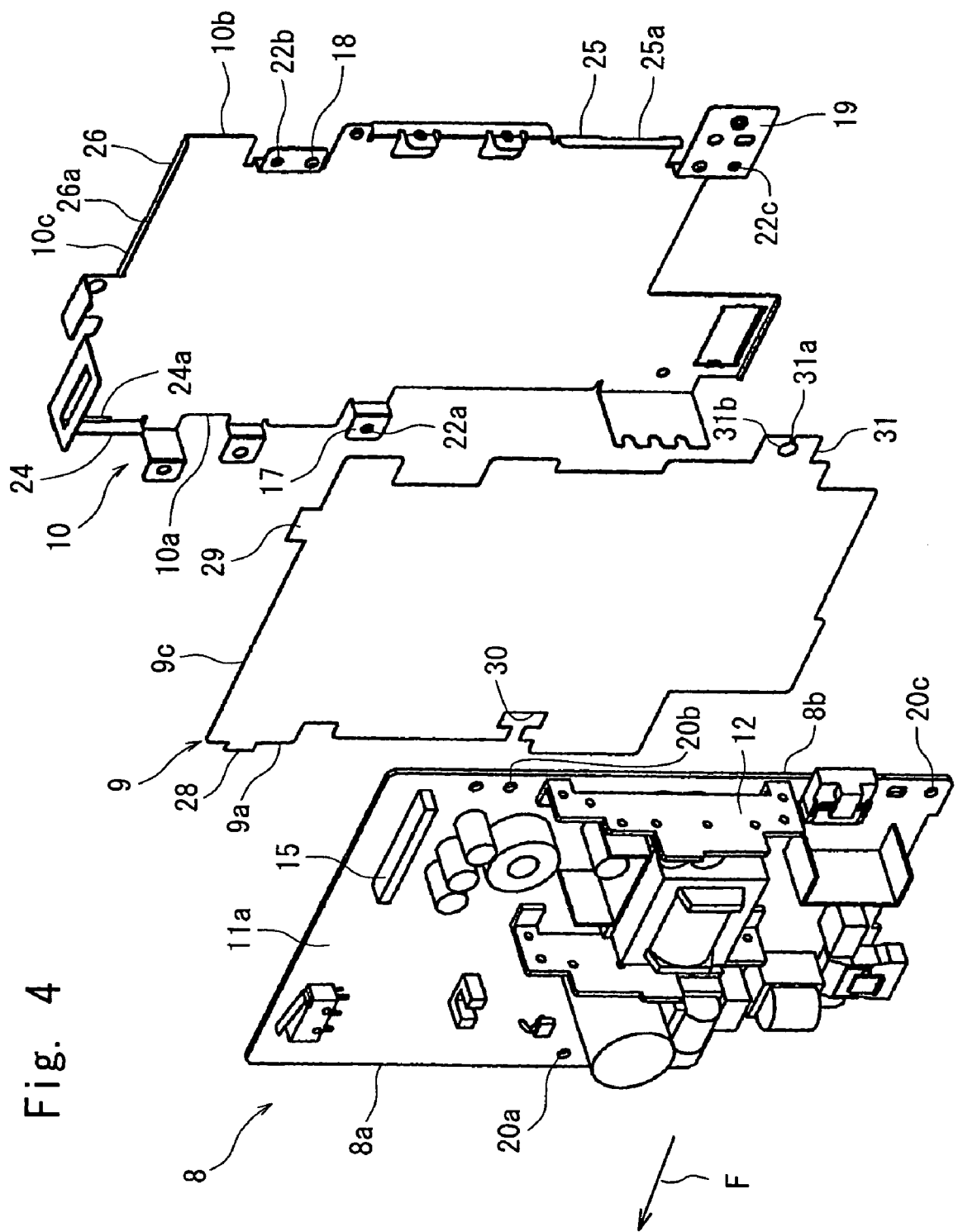
FIG. 4 is a disassembled perspective view of the circuit board assembly as viewed from the direction of FIG. 2.
Figure 5:
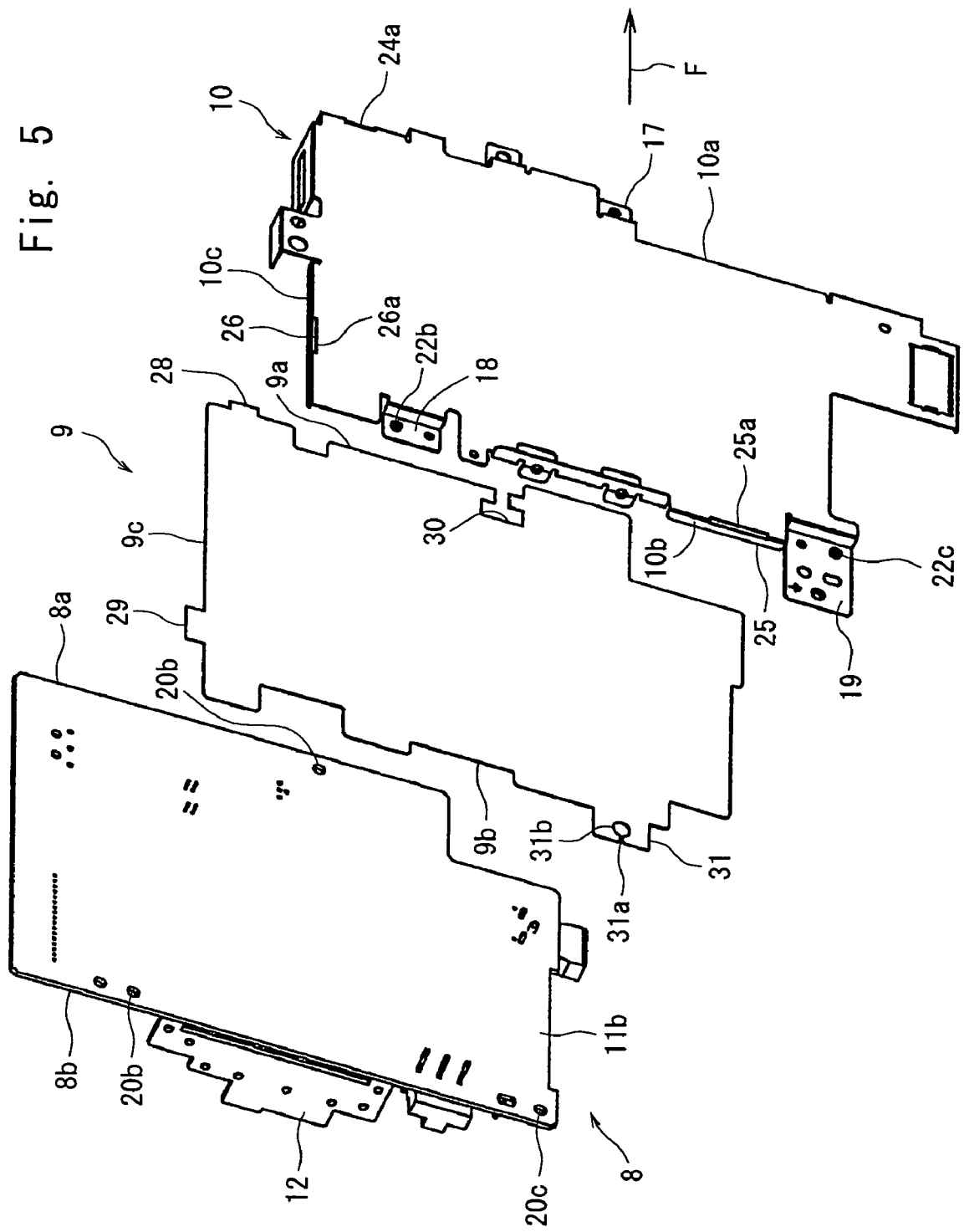
FIG. 5 is a disassembled perspective view of the circuit board assembly as viewed from the direction of FIG. 3.
Figure 6:
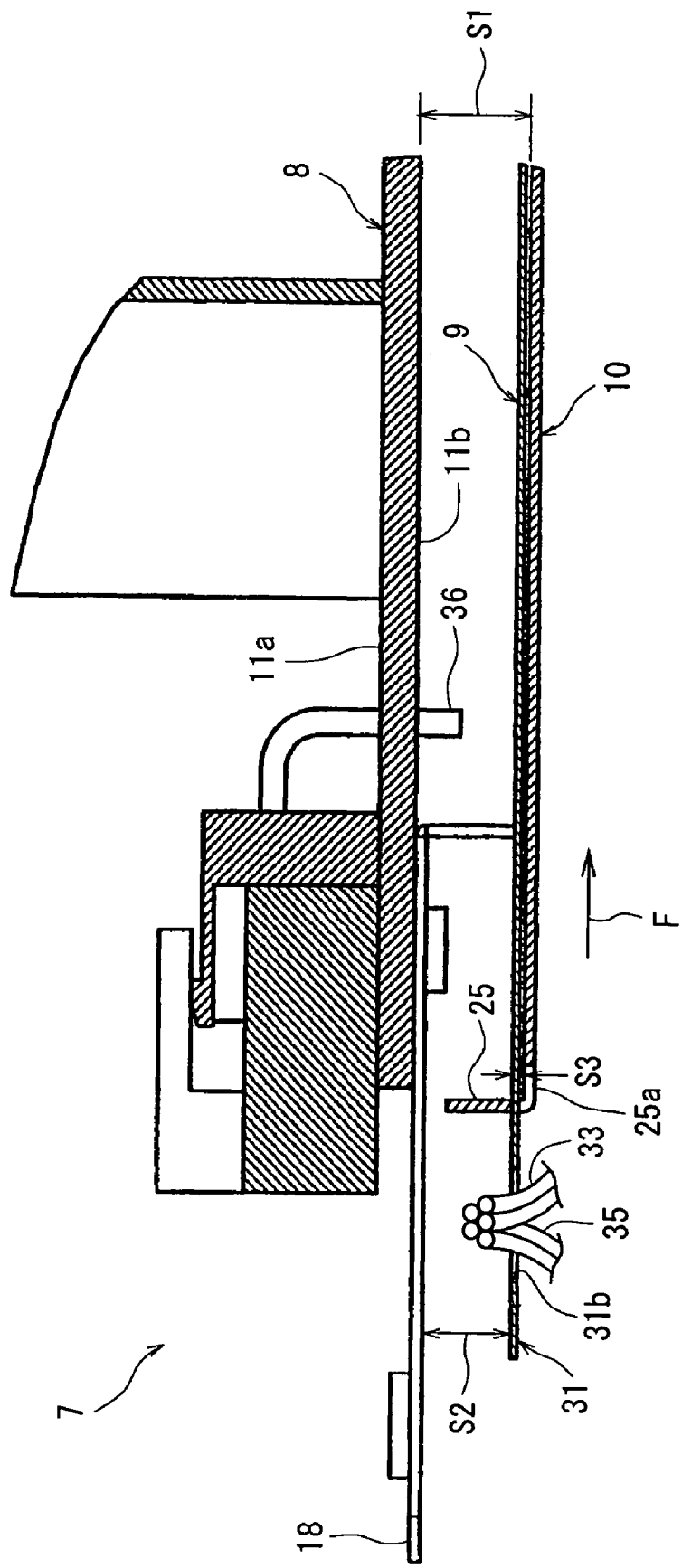
FIG. 6 is a sectional view in the direction of the line X-X in FIG. 3.

Referring to FIGS. 4 and 5, a through hole 20a for inserting a screw is formed in the circuit board 8 at a front edge portion 8a, and through holes 20b and 20c are formed therein at a rear edge portion 8b. Mounting pieces 17 to 19 are formed on the shielding plate 10 at positions corresponding to the through holes 20a to 20c. The mounting pieces 17 to 19 are folded at right angles from the front edge portion 10a and the rear edge portion 10b of the shielding plate 10 toward the circuit board 8, and have their distal ends which are further folded at right angles toward the outer sides forming a step (here, however, the mounting pieces 17 to 19 have dissimilar sizes). When the circuit board 8 is mounted on the shielding plate 10 by inserting screws in the screw holes 22a to 22c formed in the mounting pieces 17 to 19, a gap s1 is formed between the circuit board 8 and the shielding plate 10 by the amount of the step from the screw-mounting pieces 17 to 19 to the circuit board 8 as shown in FIG. 6.

Folded portions 24 to 26 are formed on the shielding plate 10 at a front edge portion 10a, a rear edge portion 10b and an upper edge portion 10c thereof being folded at right angles toward the circuit board 8, and slits 24a, 25a and 26a are formed in the folding (corner) parts of the folded portions 24 to 26 extending in a direction in which the edge portions 10a to 10c of the shielding plate 10 is extending.

A protruding piece 28 is formed at a front edge portion 9a of the insulating sheet 9 protruding forward at a position corresponding to the slit 24a, and a protruding piece 29 is formed at an upper edge portion 9c protruding upward at a position corresponding to the slit 26a. Further, a groove portion 30 is formed in the insulating sheet 9 at an intermediate position of the front edge portion 9a, and is recessed inward of the insulating sheet 9. To assemble the insulating sheet 9 onto the shielding plate 10, the protruding piece 28 is inserted in the slit 24a, the protruding piece 29 is inserted in the slit 26a and the mounting piece 17 is inserted in the groove portion 30. The protruding pieces 28 and 29 may have a length which just protrudes penetrating through the slits 24a and 26a.

A protruding piece 31 is formed at a lower portion of the rear edge potion 9b of the insulating sheet 9 protruding nearly like a tongue piece toward the outer rear side from a position corresponding to the slit 25a in the folded portion 25. In order to prevent the flapping of the protruding piece 31, the slit 25a in the folded portion 25 is forming a gap S3 between the surface of the slit 25a on the side of the folded portion 25 and the inner surface of the shielding plate 10 to be of a length nearly equal to the thickness of the insulating sheet 9. Thus, the protruding piece 31 prevents the flapping toward the inside or outside of the printer 1 and the deviation of the shielding plate 10. Concerning the gap S3, the protruding pieces 28, 29 of the insulating sheet 9 and the slits 24a, 26a, and the protruding piece 31 of the insulating sheet 9 and slit 25a are formed in the same structure so that the flapping and deviation of the insulating sheet are prevented by the gap S3. Thus, the insulating sheet 9 is arranged on the inner surface side of the shielding plate 10 between the circuit board 8 and the shielding plate 10.

Referring to FIG. 2, the insulating sheet 9 is forming a protruding piece 31 for clamping the harness bundle 33 and the harness 35 for fan. A notch (slit) 31a is formed in the protruding piece 31 extending from the distal end of the protruding piece 31 toward the circuit board 8 and reaching a round hole 31b formed in the central portion of the protruding piece 31. It is desired that the direction in which the notch 31a is formed is at right angles with, or intersects, the direction in which the harness bundle 33 and the harness 35 for fan extend. As for the width of the notch 31a, there may exist no gap. When there exists a gap, however, it is desired that the gap is narrower than the diameter of the harness or of the harness bundle. The harness bundle 33 and the harness 35 for fan (hereinafter referred to as harnesses 33, 35) are passed through the hole 31b in the protruding piece 31 so as to be clamped.

To extend the harness bundle 33 of the circuit board 8 relying upon the above constitution, the harness bundle 33 from the connector 15 of the circuit board 8 runs on the back surface side of the circuit board assembly 7 from the upper side toward the lower side, is passed through the notch 31a of the protruding piece 31, and is passed through the hole 31b so as to be clamped. Not only the harness bundle 33 of the circuit board 8 but also the harness 35 of a ventilation fan can be extended up to the protruding piece 31 and can be supported by the hole 31b. Since the direction in which the notch 31a extends is at right angles with the direction in which the harnesses 33 and 35 move at the time of clamping, the harnesses 33 and 35 are slid sideways while broadening the notch 31a by a finger tip by utilizing the elasticity of the protruding piece 31, and are easily passed through the notch 31a to easily accomplish the clamping. After the harnesses 33 and 35 are clamped, the notch 31a is closed (contacted) due to the elasticity of the protruding piece 31. After clamped, therefore, the harnesses 33 and 35 are prevented from escaping. Therefore, the assembly 7 can be easily set at the time of assembling the printer 1, and the harnesses 33 and 35 can be easily detached or attached at the time of maintenance.

Here, the notch 31a may be formed in the shape of a slit having a width. Here, however, it is desired that the slit is narrower than the widths of the harnesses 33 and 35. The harnesses 33 and 35 being clamped or after clamped are prevented from scratched since the insulating sheet 9 is made of a resin material.

Referring to FIGS. 3 and 6, the length of the protruding piece 31 protruding outward (toward the left in FIG. 6) from the side surface of the circuit board assembly 7 is smaller than the length of protrusion of the mounting piece 18, so that the harnesses 33 and 35 are prevented from interfering with other members in the periphery of the circuit board assembly 7.

Legs 36 of the members that are soldered are protruding beyond the back surface of the circuit board 8. Since the harnesses 33 and 35 extend along the side surface of the circuit board 8, the circuit board 8 is allowed to have a broad effective area for arranging the electric and electronic parts, and there is no probability that the legs 36 come in contact with the harnesses 33 and 35.

Since the insulating sheet 9 is a sheet-like member, the notch 31a and the hole 31b can be formed therein more easily than forming a notch and a hole in the circuit board. No separate member such as a screw or a clamping member is required for clamping the harnesses 33 and 35. Therefore, the extension operation is easy and device can be produced at a decreased cost.

The protruding piece 31 can assume a variety of shapes for clamping.

FIGS. 7A to 7C illustrate modified examples of the protruding piece having other shapes. Reference numerals are the same as those for the protruding piece 31 of the above embodiment.

Referring to FIG. 7A, the protruding piece 31 has the hole 31b only without the notch 31a. The protruding piece 31 forming the hole 31b only is desired when a connector is connected to an end of the harness bundle. The connector portion is passed through the hole 31b to clamp the harness bundle, and the harness is connected to an opposing connector corresponding thereto.

The protruding piece 31 shown in FIG. 7B has a feature in the shape of the notch 31a. The notch 31a is of a triangular shape which is widened on the side of the edge of the protruding piece 31 and becomes narrow toward the side of the hole 31b. The notch 31a formed in this shape is opened wide on the side from where the harness is inserted; i.e., the harness can be easily inserted into the hole 31b and does not easily escape therefrom.

The protruding piece 31 shown in FIG. 7C has the notch 31a and the hole 31b of shapes same as those of the above embodiment, but is different with respect to that a stepped portion 31c is formed which is elevated by one step above the surface of the insulating sheet 9. That is, the protruding piece 31 is folded at right angles on the surface of the insulating sheet 9 and is, further, arranged at a position being folded outward of the surface of the insulating sheet 9 in parallel therewith. By arranging the protruding piece 31 at a position higher than the surface of the insulating sheet 9, the members in the periphery of the circuit board assembly are prevented from interfering with the harnesses. This helps expand the freedom for selecting the layout in design.

An embodiment of the invention was described above in detail with reference to the accompanying drawings. However, it should be noted that the invention is in no way limited to the above embodiment only but can be modified in a variety of other ways without departing from the scope of the invention.

For example, the above embodiment has dealt with the circuit board 8 in the printer 1. However, the invention can be further applied to an assembly having the circuit board, insulating sheet and shielding plate, such as a circuit board assembly used by radios, stereos, DVD devices, computers, home electric appliances, etc and any other electric/electronic circuit board assembles.

In the above embodiment, further, the harnesses 33 and 35 were engaged with the hole 31b. In addition to the hole 31b, however, the engaging portion of the invention may be of any other shape such as a notch or a slit by which the harnesses can be hooked so as to be engaged.

In the above embodiment, one protruding piece 31 for clamping the harness 33 and 35 is formed in the insulation sheet 9, though, it may be possible to arrange appropriate plural numbers concerning with the amount of the protruding piece 31 as a clamping portion.

As described above, the structure for clamping the harnesses of the present invention comprises a circuit board on which electronic parts are mounted; a circuit board-mounting plate arranged maintaining a gap relative to the circuit board; and an insulating sheet arranged between the circuit board and the circuit board-mounting plate; wherein the insulating sheet forms a protruding portion protruding outwards beyond the circuit board, and the harnesses are engaged with the engaging portion. Therefore, the harnesses can be clamped by using a member that has been usually used. The insulating sheet used for the circuit board is, usually, made of a thin material that can be easily worked. Since the harnesses are clamped at a portion protruding beyond the circuit board, it does not happen that relatively sharp leg portions of electronic parts on the back surface of the circuit board interfere with the harnesses to cause short-circuiting.

In the structure for clamping the harnesses, the protruding portion has a hole formed in the insulating sheet and a notch formed between the hole and edge portion of the insulating sheet. Therefore, the harnesses can be easily inserted in the hole passing through the notch and, after once inserted in the hole, does not easily escape through the notch.

In the structure for clamping the harnesses, further, folded portions are formed at the edges of the circuit board-mounting plate, and slit-like holding portions are formed in the folded portions to hold the protruding portions of the insulating sheet. Therefore, even when the insulating sheet is made of a soft material, the protruding portions are prevented from undergoing the flapping.

The invention claimed is:

1. An assembly having a structure for permitting harnesses to extend around a circuit board comprising:
   the circuit board on which electronic parts are mounted;
   a circuit board-mounting plate arranged maintaining a gap relative to said circuit board; and
   an insulating sheet arranged between said circuit board and said circuit board-mounting plate;
   wherein said insulating sheet forms a protruding portion protruding outwards beyond the circuit board, a harness-engaging portion is formed in said protruding portion, and said harnesses are engaged with said harness-engaging portion.

2. The assembly having the structure for permitting harnesses to extend around a circuit board according to claim 1, wherein the harness engaging portion is formed by a hole formed in the protruding portion of said insulating sheet and by a notch formed between the hole and an edge portion of said protruding portion.

3. The assembly having the structure for permitting harnesses to extend around a circuit board according to claim 1, wherein folded portions are formed at the edges of said circuit board-mounting plate, and slit-like holding portions are formed in said folded portions to hold the protruding portion of said insulating sheet.

4. The assembly having the structure for permitting harnesses to extend around a circuit board according to claim 2, wherein the direction of said notch is at right angles with the direction in which said harnesses extend.

5. The assembly having the structure for permitting harnesses to extend around a circuit board according to claim 1, wherein a material of the insulating sheet is one of polyethylene terephthalate, fluoroplastic, polyvinyl chloride resin and rubber.

6. An image-forming machine incorporating an assembly having a structure for permitting harnesses to extend around a circuit board, the harnesses to connect members of the image-forming machine, the assembly comprising:
   the circuit board on which electronic parts are mounted;
   a circuit board-mounting plate arranged maintaining a gap relative to said circuit board; and
   an insulating sheet arranged between said circuit board and said circuit board mounting plate;
   wherein said insulating sheet forms a protruding portion protruding outwards beyond the circuit board, a harness-engaging portion is formed in said protruding portion, and said harnesses are engaged with said harness-engaging portion.

7. The image-forming apparatus incorporating an assembly having the structure for permitting harnesses to extend around a circuit board according to claim 6, wherein the harness-engaging portion is formed by a hole formed in the protruding portion of said insulating sheet and by a notch formed between the hole and an edge portion of said protruding portion.

8. The image-forming apparatus incorporating an assembly having the structure for permitting harnesses to extend around a circuit board according to claim 6, wherein folded portions are formed at the edges of said circuit board-mounting plate, and slit-like holding portions are formed in said folded portions to hold the protruding portions of said insulating sheet.

9. The image-forming apparatus incorporating an assembly having the structure for permitting harnesses to extend around a circuit board according to claim 7, wherein the direction of said notch is at right angles with the direction in which said harnesses extend.

10. The image-forming apparatus incorporating an assembly having the structure for permitting harnesses to extend around a circuit board according to claim 6, wherein a material of the insulating sheet is one of polyethylene terephthalate, fluoroplastic, polyvinyl chloride resin and rubber.

11. An assembly having a structure for permitting harnesses to extend around a circuit board comprising:
   the circuit board on which electronic parts are mounted;
   a circuit board-mounting portion arranged to maintain a gap relative to said circuit board; and
   an insulating sheet arranged between said circuit board and said circuit board mounting portion,
   wherein said insulating sheet forms a harness-engaging portion and said harnesses are engaged with said harness-engaging portion.

* * * * *